US 9,058,294 B2

(12) United States Patent
Kono

(10) Patent No.: US 9,058,294 B2
(45) Date of Patent: Jun. 16, 2015

(54) PROGRAMMABLE LOGIC CONTROLLER

(75) Inventor: Takumi Kono, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 161 days.

(21) Appl. No.: 13/985,366

(22) PCT Filed: Mar. 22, 2011

(86) PCT No.: PCT/JP2011/056795
§ 371 (c)(1),
(2), (4) Date: Aug. 14, 2013

(87) PCT Pub. No.: WO2012/127612
PCT Pub. Date: Sep. 27, 2012

(65) Prior Publication Data
US 2013/0326287 A1    Dec. 5, 2013

(51) Int. Cl.
*G06F 11/00* (2006.01)
*G06F 11/14* (2006.01)
*G06F 11/07* (2006.01)
*G05B 19/05* (2006.01)

(52) U.S. Cl.
CPC ............ *G06F 11/14* (2013.01); *G06F 11/0745* (2013.01); *G06F 11/0751* (2013.01); *G05B 19/054* (2013.01); *G05B 2219/1109* (2013.01); *G06F 11/079* (2013.01)

(58) Field of Classification Search
CPC . H01L 25/115; G06F 11/2736; G06F 13/362; H04Q 3/625; H02B 1/21; G05B 2219/21015; G07C 3/00
See application file for complete search history.

(56) References Cited

U.S. PATENT DOCUMENTS

| | | | | |
|---|---|---|---|---|
| 3,959,775 A * | 5/1976 | Valassis et al. | ............... | 710/113 |
| 5,172,310 A * | 12/1992 | Deam et al. | ................... | 363/144 |
| 5,619,392 A * | 4/1997 | Bertsch et al. | ................... | 361/65 |
| 5,742,851 A * | 4/1998 | Sekine | .............................. | 714/43 |
| 6,594,768 B1 * | 7/2003 | Ono et al. | ...................... | 713/300 |
| 2002/0110146 A1 * | 8/2002 | Thayer et al. | .................. | 370/465 |

(Continued)

FOREIGN PATENT DOCUMENTS

| | | |
|---|---|---|
| JP | 61-060103 A | 3/1986 |
| JP | 02-014343 A | 1/1990 |

(Continued)

OTHER PUBLICATIONS

International Search Report of PCT/JP2011/056795 dated Jul. 5, 2011.

(Continued)

*Primary Examiner* — Loan L. T. Truong
(74) *Attorney, Agent, or Firm* — Sughrue Mion, PLLC; Richard C. Turner

(57) ABSTRACT

A programmable logic controller of the invention comprises: a CPU unit; various kinds of units controlled by the CPU unit and coupled via common connectors, that is, input/output units, an end cover, a branch unit and an extension unit; an internal bus provided extending through the CPU unit and the various kinds of units to connect the CPU unit and the various kinds of units; and a bus I/F provided in each of the various kinds of units in common and holding anomaly detection data for detecting an anomaly in the internal bus. The CPU unit checks the anomaly detection data read out from the bus I/F of each of the various kinds of units, thereby to detect an anomaly place in the internal bus.

4 Claims, 2 Drawing Sheets

(56) References Cited

U.S. PATENT DOCUMENTS

| | | | |
|---|---|---|---|
| 2003/0023400 A1* | 1/2003 | Sanpei et al. | 702/151 |
| 2003/0105891 A1* | 6/2003 | Moriyama | 710/2 |
| 2006/0111868 A1* | 5/2006 | Beshears et al. | 702/173 |
| 2008/0163034 A1* | 7/2008 | Tate et al. | 714/799 |
| 2009/0070514 A1* | 3/2009 | Moriyama et al. | 710/311 |
| 2009/0164806 A1* | 6/2009 | Dishman et al. | 713/300 |
| 2009/0279423 A1* | 11/2009 | Suresh et al. | 370/216 |
| 2011/0082965 A1* | 4/2011 | Koka et al. | 711/103 |

FOREIGN PATENT DOCUMENTS

| | | | |
|---|---|---|---|
| JP | 02-014343 A | | 11/1990 |
| JP | 05-224964 A | | 9/1993 |
| JP | 09-050305 A | | 2/1997 |
| JP | 09-50305 A | | 2/1997 |
| JP | 09-114622 A | | 5/1997 |
| JP | 10-074104 A | | 3/1998 |
| JP | 2000333322 A | * | 11/2000 |
| JP | 2002-006910 A | | 1/2002 |
| JP | 2005-149294 A | | 6/2005 |
| JP | 2007-310719 A | | 11/2007 |
| JP | 2007310719 A | * | 11/2007 |
| JP | 2008-084276 A | | 4/2008 |
| JP | 2008-097369 A | | 4/2008 |
| JP | 2008-097523 A | | 4/2008 |
| JP | 2008-269013 A | | 11/2008 |
| JP | 2010-055384 A | | 3/2010 |
| TW | 200825911 A | | 6/2008 |
| TW | 200827959 A | | 7/2008 |

OTHER PUBLICATIONS

Taiwanese Office Action, dated Mar. 3, 2014, Application No. 100134736.

* cited by examiner

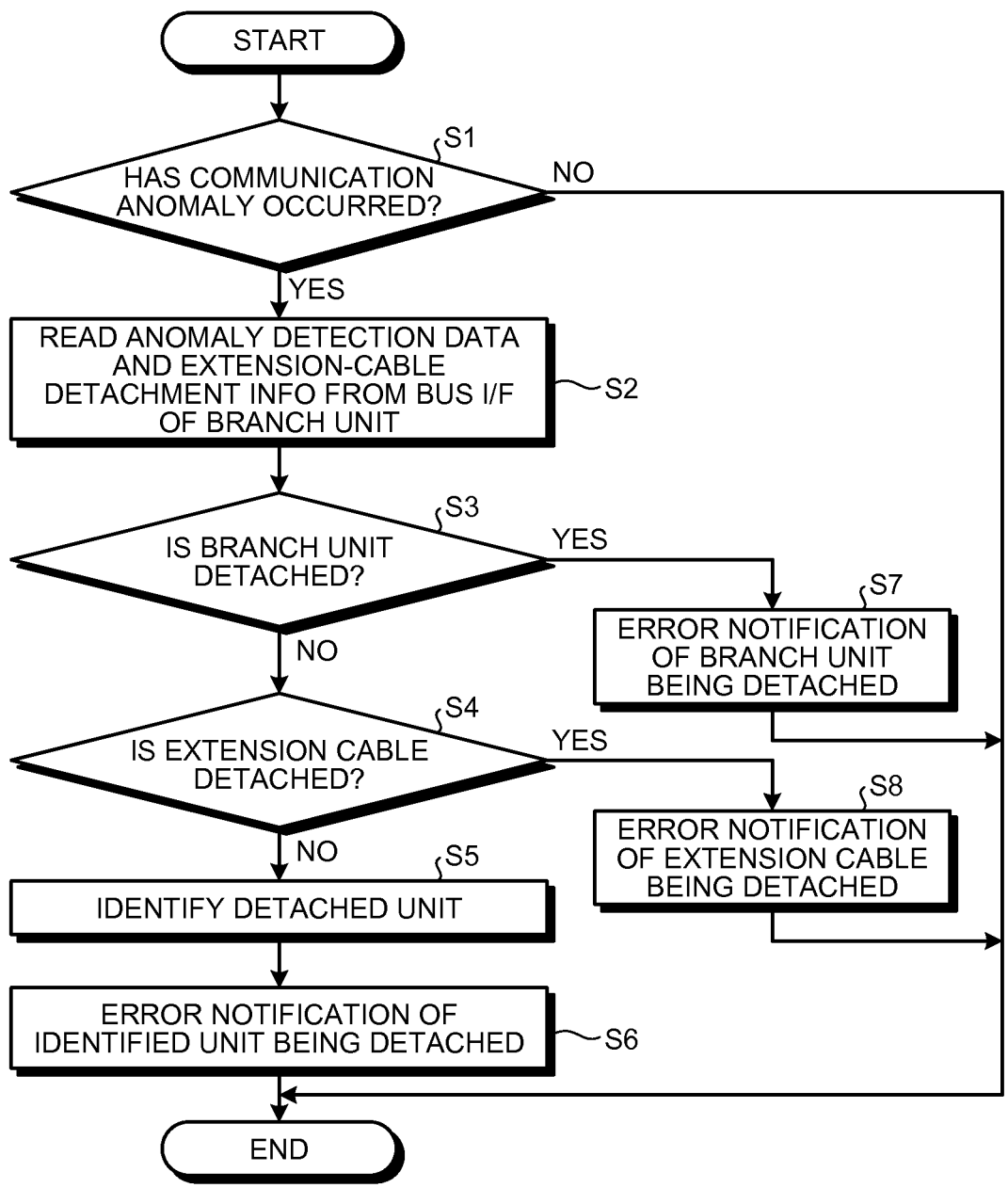

PROGRAMMABLE LOGIC CONTROLLER

CROSS REFERENCE TO RELATED APPLICATIONS

This is a National Stage of International Application No. PCT/JP2011/056795 filed Mar. 22, 2011, the content of all of which is incorporated herein by reference in its entirety.

FIELD

The present invention relates to processing when a communication anomaly has occurred in an internal bus in a programmable logic controller.

BACKGROUND

Conventionally, building-block-type programmable logic controllers constructed of multiple units have been used in the field of factory automation. As to programmable logic controllers, a technique has been proposed, in which a connection state of a bus between a programmable logic controller and an external device is detected by a hardware circuit and resultant information is stored in a CPU (refer to, for example, Patent Literatures 1, 3 and 4). Further, for example, in Patent Literature 2, a technique is proposed, in which states such as disconnection or short-circuiting of connection between an input slave unit of a programmable logic controller and an external device are detected, and the place where a communication anomaly exists is identified.

CITATION LIST

Patent Literature
Patent Literature 1: Japanese Patent Application Laid-open No. 2008-269013
Patent Literature 2: Japanese Patent Application Laid-open No. 2005-149294
Patent Literature 3: Japanese Patent Application Laid-open No. 2010-55384
Patent Literature 4: Japanese Patent Application Laid-open No. 10-74104

SUMMARY

Technical Problem

Anomaly detection according to the conventional technique can be applied in the case where the paths of bus signals are formed by connection via a single connector or a backplane base unit and a CPU unit and units each have an independent internal bus. In a so-called baseless-type system constructed to have units directly coupled with each other, the paths of bus signals are connected via the unit, and a CPU unit and the other units completely share an internal bus. If anomaly detection according to the conventional technique system is applied to the system wherein an internal bus is completely shared, then communication anomalies in the internal bus can be detected, but the problem occurs that it is difficult to identify anomaly places.

The present invention was made in view of the above-mentioned circumstances, and an object thereof is to provide a programmable logic controller that can accurately identify the place where a communication anomaly has occurred in the internal bus.

Solution to Problem

In order to solve the above-mentioned problems and achieve the object, the present invention provides a programmable logic controller comprising: a CPU unit; various kinds of units controlled by the CPU unit and coupled via common connectors; an internal bus provided extending through the CPU unit and the various kinds of units to connect the CPU unit and the various kinds of units; and a bus interface provided in each of the various kinds of units in common and holding anomaly detection data for detecting an anomaly in the internal bus, wherein the CPU unit checks the anomaly detection data read out from the bus interface of each of the various kinds of units, thereby to detect an anomaly place in the internal bus.

Advantageous Effects of Invention

According to the present invention, an anomaly place in an internal bus can be determined in a system wherein a CPU unit and units completely share the internal bus by applying a bus interface thereto. Therefore, the place where a communication anomaly has occurred in the internal bus can be accurately identified.

BRIEF DESCRIPTION OF DRAWINGS

FIG. 2 is a flow chart for explaining a procedure for diagnosing a communication anomaly in an internal bus by the programmable logic controller.

DESCRIPTION OF EMBODIMENTS

Figure 1:
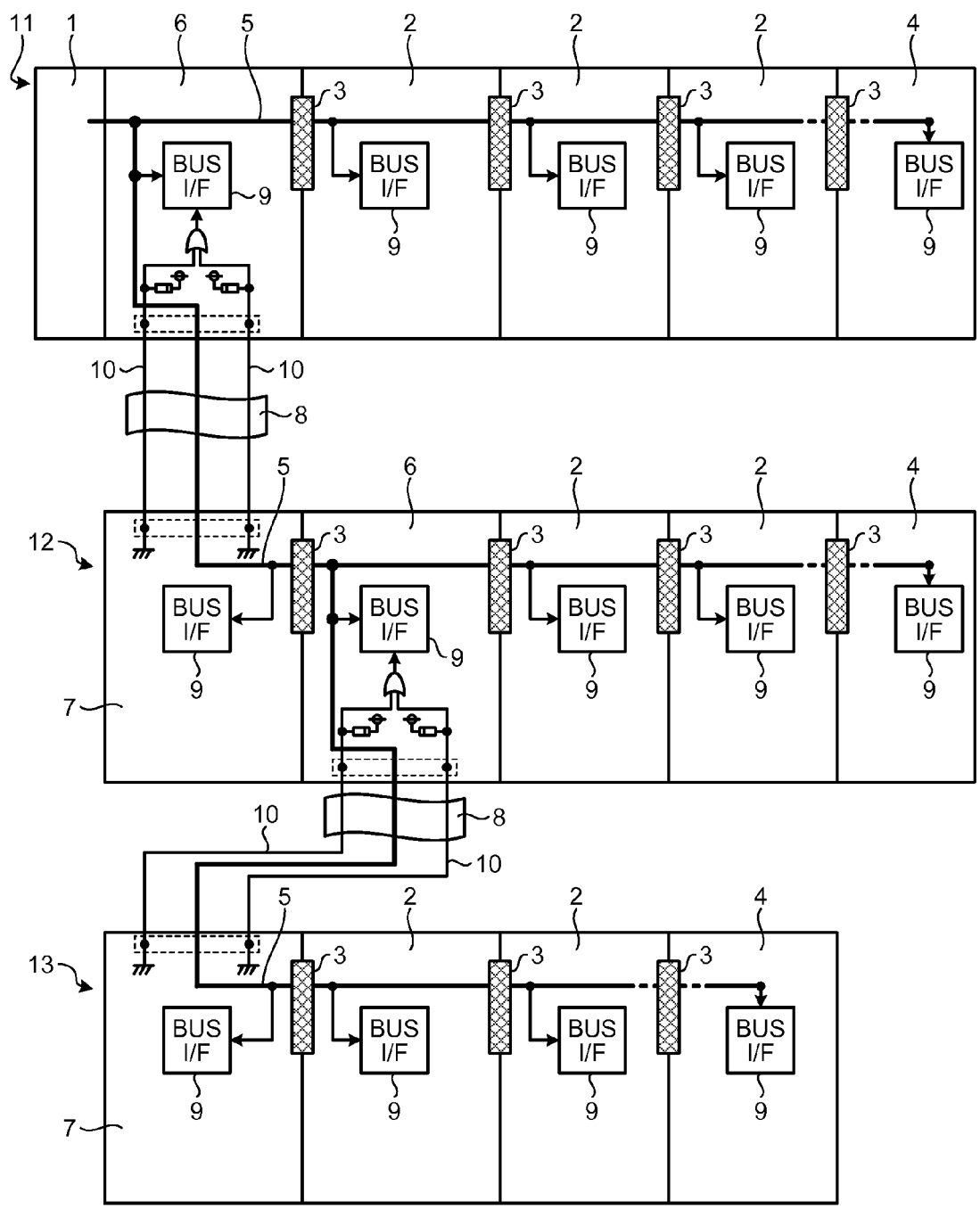
FIG. 1 is a block diagram showing the configuration of a programmable logic controller according to an embodiment of the present invention.

An embodiment of the programmable logic controller according to the present invention will be described in detail below with reference to the drawings. Note that the embodiment is not intended to limit the present invention.

Embodiment

FIG. 1 is a block diagram showing the configuration of a programmable logic controller according to an embodiment of the present invention. In the present embodiment, a programmable logic controller which comprises a basic block 11 and two extension blocks 12 and 13 is taken as an example. The basic block 11 and the extension block 12 are connected via an extension cable 8. The extension blocks 12 and 13 are connected via an extension cable 8.

The basic block 11 has a CPU unit 1, and various kinds of units, that is, a branch unit 6, input/output units 2 and an end cover 4. In the basic block 11, the various kinds of units are directly coupled via common connectors 3.

The extension block 12 has various kinds of units, that is, an extension unit 7, a branch unit 6, input/output units 2, and an end cover 4. The extension block 13 has various kinds of units, that is, an extension unit 7, input/output units 2, and an end cover 4. In the extension blocks 12 and 13, the various kinds of units are directly coupled via common connectors 3.

The CPU unit 1 controls the entire programmable logic controller including the units of the blocks 11, 12, and 13. The input/output unit 2 performs operations such as reading in input data from various kinds of input devices (not shown) and sending out output signals to various kinds of output devices (not shown). The end covers 4 are provided at ends of the basic block 11, and the extension blocks 12 and 13. The end cover 4 is a unit that performs a termination process for a system. In the basic block 11, an internal bus 5 is provided extending through the CPU unit 1, the branch unit 6, the input/output units 2 and the end cover 4 to connect them in series.

The branch unit 6 provided in the basic block 11 makes the internal bus 5 divide into a part on the input/output unit 2 side in the basic block 11 and a part on the extension cable 8 side. The extension cable 8 connects the branch unit 6 in the basic block 11 and the extension unit 7 in the extension block 12. Extension-cable detachment detection signals 10 pass through the extension cable 8.

In the extension block 12, the internal bus 5 is provided extending through the extension unit 7, the branch unit 6, the input/output units 2 and the end cover 4 to connect them in series. The branch unit 6 provided in the extension block 12 makes the internal bus 5 divide into a part on the input/output unit 2 side in the extension block 12 and a part on an extension cable 8 side. The extension cable 8 connects the branch unit 6 in the extension block 12 and the extension unit 7 in the extension block 13. Extension-cable detachment detection signals 10 pass through the extension cable 8. In the extension block 13, the internal bus 5 is provided extending through the extension unit 7, the input/output units 2 and the end cover 4 to connect them in series.

The various kinds of units in the programmable logic controller, that is, the input/output units 2, the end covers 4, the branch units 6 and the extension units 7 each comprise a bus interface (I/F) 9 provided in common with each other. In each unit, the bus I/F 9 is connected to the internal bus 5. The bus I/F 9 holds anomaly detection data for detecting an anomaly of the internal bus 5. The anomaly detection data of the bus I/F 9 can be transmitted via the internal bus 5.

A register for diagnosing the internal bus is provided in the bus I/F 9. The CPU unit 1 accesses the register of the bus I/F 9 to read and check the anomaly detection data, thereby detecting an anomaly place of the internal bus 5 point by point.

Also, a register for holding extension-cable detachment information for detecting the detachment of the extension cable 8 is provided in the bus I/F 9. The bus I/F 9 has the extension-cable detachment information holding register connected to the extension-cable detachment detection signals 10 and thus detects the connection state of the extension cable 8 to obtain the extension-cable detachment information. The extension-cable detachment information of the bus I/F 9 can be transmitted via the internal bus 5. The CPU unit 1 accesses the register of the bus I/F 9 to read out the extension-cable detachment information. The CPU unit 1 detects the connection state of the extension cable 8 point by point from the read extension-cable detachment information.

The extension-cable detachment detection signals 10 are pulled up in the branch units 6 from the extension unit 7 via the extension cable 8. When the extension cable 8 is detached, the extension-cable detachment detection signal connected to the bus I/F 9 becomes a high level, and the extension-cable detachment information is stored in the register for detecting extension-cable detachment in the bus I/F 9. The extension-cable detachment detection signals 10 are placed at both the left and right sides of the extension cable 8. Hence, even if the extension cable 8 is half detached, that is, one of the detection signal lines at both the left and right sides is detached, it is possible to detect that the extension cable 8 is detached.

The configuration of the programmable logic controller is not limited to cases described in the present embodiment. For example, the number of extension blocks provided in the programmable logic controller is not limited to two, but may be any number. The number of input/output units provided in each block may be any number. Further, the various kinds of units provided in the programmable logic controller may include other units than those described in the present embodiment.

FIG. 2 is a flow chart for explaining a procedure for diagnosing a communication anomaly of the internal bus by the programmable logic controller. The CPU unit 1 determines whether or not a communication anomaly has occurred in the entire internal bus 5 in the programmable logic controller (step S1). The CPU unit 1 reads out the anomaly detection data from the bus I/F 9 of each end cover 4, for example, so as to determine whether or not a communication anomaly has occurred in the internal bus 5. If a communication anomaly has not occurred (No at the step S1), the CPU unit 1 ends the process.

The communication anomaly in the internal bus 5 may be due to detachment of the branch unit 6, detachment of the extension cable 8, or detachment of any of the various kinds of units other than the branch units 6.

Here, description will be made taking a communication anomaly in the extension block 12 as an example. If a communication anomaly has occurred (Yes at the step S1), the CPU unit 1 reads out the anomaly detection data and the extension-cable detachment information from the bus I/F 9 of the branch unit 6 of the basic block 11 located at a stage prior to the extension block 12 (step S2). The CPU unit 1 determines from the read-out anomaly detection data whether or not the branch unit 6 is detached (step S3).

If determining that the branch unit 6 is detached (Yes at the step S3), the CPU unit 1 outputs an error notification to the effect that the branch unit 6 of the basic block 11 is detached (step S7) and ends the process. If determining that the branch unit 6 is not detached (No at the step S3), the CPU unit 1 determines from the read-out extension-cable detachment information whether or not the extension cable 8 is detached (step S4).

If determining that the extension cable 8 is detached (Yes at the step S4), the CPU unit 1 outputs an error notification to the effect that the extension cable 8 between the basic block 11 and the extension block 12 is detached (step S8) and ends the process. If determining that the extension cable 8 is not detached (No at the step S4), the CPU unit 1 reads out anomaly detection data from the various kinds of units of the extension block 12 to identify a detached unit (step S5). The CPU unit 1 outputs an error notification to the effect that the identified unit is detached (step S6) and ends the process.

In the case of communication anomaly in the extension block 13, the CPU unit 1 further determines whether or not the branch unit 6 of the extension block 12 located at the stage in front of the extension block 13 is detached. Further, the CPU unit 1 determines whether or not the extension cable 8 between the extension block 13 and the extension block 12 is detached. Yet further, the CPU unit 1 identifies a detached unit from among the units of the extension block 13.

In the case of communication anomaly in the basic block 11, the CPU unit 1 identifies a detached unit from among the units of the basic block 11. The programmable logic controller, for example, regularly carries out the diagnosis of communication anomaly described in the present embodiment, or the programmable logic controller may carry out the diagnosis of communication anomaly described in the present embodiment according to operation by a user.

The CPU unit 1 identifies the unit or the extension cable 8 in which a communication anomaly has occurred and makes an error notification or the like by, e.g., a monitor and thereby can immediately make notification of the place where a communication anomaly has occurred. The CPU unit 1 may identify a failed unit according to a diagnosis procedure similar to that for identifying a communication anomaly place in the internal bus 5.

With the bus I/Fs 9 being used, the programmable logic controller according to the present embodiment can determine, by the CPU unit 1, anomaly places in the internal bus 5 in the system wherein the CPU unit 1 and the units completely share the internal bus 5. Further, the programmable logic controller holds the extension-cable detachment information in the bus I/F 9 of the branch unit 6 and thereby can detect, by the CPU unit 1, whether or not the extension cable 8 is detached. Hence, the programmable logic controller can accurately identify the place where a communication anomaly has occurred and improve troubleshooting.

As to the detachment of the extension cable 8 at system startup, the programmable logic controller may treat it as normal, not a communication anomaly. For example, if the user desires future system extension, the programmable logic controller can be configured with the extension cable 8 being detached. Hence, the system construction with greater degrees of freedom is possible for the programmable logic controller.

REFERENCE SIGNS LIST

1 CPU unit
2 Input/output unit
3 Common connector
4 End cover
5 Internal bus
6 Branch unit
7 Extension unit
8 Extension cable
9 Bus I/F
10 Extension-cable detachment detection signal
11 Basic block
12, 13 Extension block

The invention claimed is:

1. A programmable logic controller that includes a basic block and an extension block coupled to the basic block via an extension cable and has a baseless structure, comprising:
a CPU unit provided in the basic block;
various kinds of units controlled by the CPU unit and coupled via common connectors;
an internal bus provided extending through the CPU unit and the various kinds of units to connect the CPU unit and the various kinds of units; and
a branch unit that is one of the various kinds of units which makes the internal bus divide into some parts, one of which is connectable to the extension cable,
wherein the various kinds of units each comprise a bus interface holding anomaly detection data for detecting an anomaly in the internal bus,
the bus interface of the branch unit further holds extension-cable detachment information for detecting detachment of the extension cable, and
the CPU unit, when determining that a communication anomaly has occurred in the internal bus, detects a connection state of the extension cable from the extension-cable detachment information read out from the bus interface of the branch unit, and when determining that the connection of the extension cable is normal, checks the anomaly detection data read out from the bus interface of each of the various kinds of units, thereby to detect an anomaly place in the internal bus.

2. The programmable logic controller according to claim 1, wherein the CPU unit determines whether or not an anomaly exists in the internal bus in the branch unit from the anomaly detection data read out from the bus interface of the branch unit before detecting the connection state of the extension cable.

3. The programmable logic controller according to claim 1, wherein when determining that a communication anomaly exists in the internal bus, the CPU unit identifies a unit of the various kinds of units or the extension cable in which the communication anomaly has occurred and makes an error notification.

4. The programmable logic controller according to claim 2, wherein when determining that a communication anomaly exists in the internal bus, the CPU unit identifies a unit of the various kinds of units or the extension cable in which the communication anomaly has occurred and makes an error notification.

* * * * *